(12) United States Patent
Wang et al.

(10) Patent No.: US 11,372,822 B2
(45) Date of Patent: Jun. 28, 2022

(54) METHOD, DEVICE, AND COMPUTER APPARATUS FOR MERGING REGIONS OF HBASE TABLE

(71) Applicant: CHINA UNIONPAY CO., LTD., Shanghai (CN)

(72) Inventors: Yaxiong Wang, Shanghai (CN); Jien Zhou, Shanghai (CN); Yingzhuo Wang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 49 days.

(21) Appl. No.: 16/977,687

(22) PCT Filed: Mar. 19, 2019

(86) PCT No.: PCT/CN2019/078784
§ 371 (c)(1),
(2) Date: Sep. 2, 2020

(87) PCT Pub. No.: WO2019/179449
PCT Pub. Date: Sep. 26, 2019

(65) Prior Publication Data
US 2020/0394163 A1    Dec. 17, 2020

(30) Foreign Application Priority Data
Mar. 22, 2018 (CN) .......................... 201810241805.3

(51) Int. Cl.
*G06F 16/18* (2019.01)
*G06F 16/215* (2019.01)
(Continued)

(52) U.S. Cl.
CPC ........ *G06F 16/1844* (2019.01); *G06F 16/215* (2019.01); *G06F 16/2282* (2019.01); *G06F 16/24556* (2019.01)

(58) Field of Classification Search
None
See application file for complete search history.

(56) References Cited

U.S. PATENT DOCUMENTS

2013/0282668 A1    10/2013  Hsieh
2014/0081918 A1*   3/2014   Srivas .................... G06F 16/13
                                                              707/639

FOREIGN PATENT DOCUMENTS

CN           103593436 A           2/2014
CN           103631940 A           3/2014
(Continued)

OTHER PUBLICATIONS

Apps In The Open, "Merge Empty HBase Regions," May 30, 2017 (Year: 2017).*
(Continued)

*Primary Examiner* — Yu Zhao
(74) *Attorney, Agent, or Firm* — Anova Law Group, PLLC

(57) ABSTRACT

A method, a device, and a computer apparatus for merging regions of a HBase table are provided. The method includes acquiring attribute information of HDFS files corresponding to each region in a plurality of regions in the HBase table, where the attribute information of the HDFS files corresponding to one region includes storage space occupied by the files corresponding to the one region, and performing merging processing on every two adjacent regions in the plurality of regions at least according to the storage space occupied by the files corresponding to each region in the plurality of regions. Performing the merging based on the storage space occupied by the files corresponding to the regions in the embodiments of the present disclosure may be beneficial for improving the precision of merging two adjacent regions.

14 Claims, 3 Drawing Sheets

---

Acquiring the attribute information of the HDFS files corresponding to each data unit in the plurality of data units in the HBase table, where the attribute information of the HDFS files corresponding to one data unit includes the storage space occupied by the files corresponding to the one data unit — 201

Performing the merging processing on every two adjacent data units in the plurality of data units at least according to the storage space occupied by the files corresponding to each data unit in the plurality of data units — 202

(51) Int. Cl.
*G06F 16/182* (2019.01)
*G06F 16/2455* (2019.01)
*G06F 16/22* (2019.01)

(56) References Cited

FOREIGN PATENT DOCUMENTS

| | | | |
|---|---|---|---|
| CN | 104199901 | A | 12/2014 |
| CN | 104346564 | A | 2/2015 |
| CN | 105005617 | A | 10/2015 |
| CN | 106843763 | A | 6/2017 |
| CN | 108563698 | A | 9/2018 |

OTHER PUBLICATIONS

The World Intellectual Property Organization (WIPO) International Search Report for PCT/CN2019/078784 dated Jun. 21, 2019 5 Pages (including translation).

\* cited by examiner

```
┌─────────────────────────────────────────────────────────────────────┐
│ Acquiring the attribute information of the HDFS files corresponding to each │
│ data unit in the plurality of data units in the HBase table, where the attribute │ ~ 201
│ information of the HDFS files corresponding to one data unit includes the │
│   storage space occupied by the files corresponding to the one data unit    │
└─────────────────────────────────────────────────────────────────────┘
                                    │
┌─────────────────────────────────────────────────────────────────────┐
│ Performing the merging processing on every two adjacent data units in the │
│ plurality of data units at least according to the storage space occupied by the │ ~ 202
│     files corresponding to each data unit in the plurality of data units    │
└─────────────────────────────────────────────────────────────────────┘
```

FIG. 2

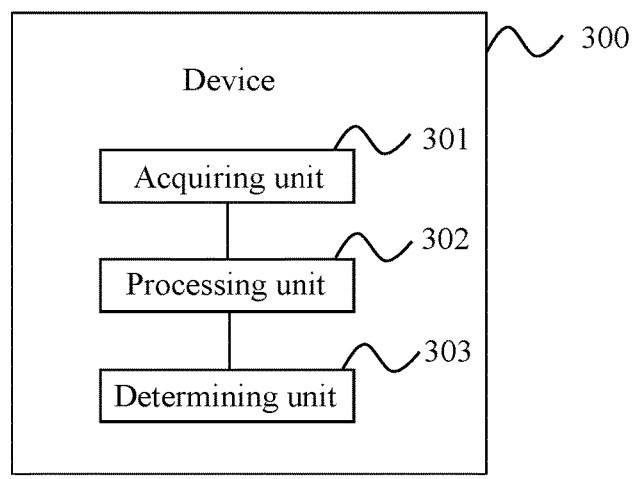

FIG. 3

METHOD, DEVICE, AND COMPUTER APPARATUS FOR MERGING REGIONS OF HBASE TABLE

CROSS-REFERENCES TO RELATED APPLICATIONS

This application is a national phase entry under 35 U.S.C § 371 of International Application No. PCT/CN2019/078784, filed on Mar. 19, 2019, which claims priority of Chinese Patent Application No. 201810241805.3, filed with the State Intellectual Property Office of P. R. China on Mar. 22, 2018, the entire content of all of which is incorporated herein by reference.

FIELD OF THE DISCLOSURE

The present disclosure generally relates to the technical field of region processing and, more particularly, relates to a method, a device, and a computer apparatus for merging regions of a HBase table.

BACKGROUND

The Hadoop distributed file system database (i.e., HBase) is a distributed, column-oriented open source database. HBase, different from a general relational database, is a database suitable for unstructured data storage. HBase is a distributed database which can provide real-time computation, and data is stored on the Hadoop distributed file system (HDFS). HBase may divide a table into small data units called regions. HBase may include a plurality of regions, and each region may store certain data. Regions may be allocated to a plurality of region servers by HMaster, and each region server may host the plurality of regions.

Generally, the greater the quantity of regions included in HBase is, the better the read/write performance and scalability of HBase is, and the better the corresponding application performance and scalability is. However, due to the mechanism implemented by HBase and the imbalance of service data, the quantity of regions in the HBase table may increase with time, more memory may be required, and more regions may need to be managed, which have negative impacts on the system performance and stability. In order to solve such problem, the regions are required to be merged. Two adjacent regions may be merged in a manual mode in the existing technology. Specifically, an administrator may log into the monitoring page of the HBase table, select two adjacent regions in the monitoring interface, and then merge two regions in the HBase shell.

However, when using the existing merging technology, adjacent regions in the HBase table have to be randomly merged only in a manual mode, which causes low region merging efficiency and poor merging precision.

BRIEF SUMMARY OF THE DISCLOSURE

The present disclosure provides a method, a device, and a computer apparatus for merging regions of a Hadoop distributed file system database (HBase) table, which may be used to solve the problem of low region merging efficiency and poor merging precision in the existing technology.

The embodiments of the present disclosure provide the method for merging regions of the HBase table, including acquiring attribute information of HDFS files corresponding to each region in a plurality of regions in the HBase table, where the attribute information of the HDFS files corresponding to one region includes storage space occupied by the files corresponding to the one region, and performing merging processing on every two adjacent regions in the plurality of regions at least according to the storage space occupied by the files corresponding to each region in the plurality of regions.

In the embodiments of the present disclosure, by acquiring the attribute information, which is the storage space occupied by the files corresponding to the region, of the HDFS files corresponding to each region in the plurality of regions in the HBase table, the merging processing may be performed on every two adjacent regions in the plurality of regions according to the storage space occupied by the files corresponding to each region in the plurality of regions. Therefore, performing the merging based on the storage space occupied by the files corresponding to the regions in the embodiments of the present disclosure may be beneficial for improving the precision of merging two adjacent regions. Furthermore, two adjacent regions need to be merged may be automatically determined without manual operation, which may improve the region merging efficiency.

In the embodiments of the present disclosure, the scenario where one region in two adjacent regions exists in a plurality of two adjacent regions may be possible. In order to ensure the list in two adjacent regions only containing a unique region, increase the region merging precision and improve the code stability, optionally, before performing the merging processing on two adjacent regions in the plurality of regions at least according to the storage space occupied by the files corresponding to each region of the plurality of regions, the method may further include eliminating duplicate regions.

Optionally, performing merging processing on every two adjacent regions in the plurality of regions at least according to the storage space occupied by the files corresponding to each region in the plurality of regions includes:

for a first region and a second region, determining a sum of storage space occupied by files corresponding to the first region and the second region, wherein the first region and the second region are any two adjacent regions in the plurality of regions, determining a first score corresponding to the first region and the second region according to the sum of the storage space occupied by the files and a storage space threshold, determining a total score corresponding to the first region and the second region at least according to the first score, and performing the merging processing on the first region and the second region if the total score satisfies a preset value.

Two adjacent regions need to be merged may be selected through the first score, which may improve the precision of merging two adjacent regions.

If the sums of the storage space occupied by the files corresponding to two Regions_Pairs are same, in order to improve the precision of selecting two adjacent regions which need to be merged, optionally, the attribute information of the HDFS file corresponding to one region may further include the quantity of files corresponding to the region; the sum of the quantities of the files corresponding to the first region and the second region may be determined; the second score corresponding to the first region and the second region may be determined according to the sum of the file quantities and the file quantity threshold value; and determining the total score corresponding to the first region and the second region at least according to the first score may include determining the total score corresponding to the first region and the second region at least according to the first score and the second score.

When compressing the regions, in the case if the .tmp directory of the regions exists in the regions, merging the regions causes issues on performance and stability. Optionally, the attribute information of the HDFS file corresponding to the one region may further include whether the .tmp directory is contained; a third score corresponding to the first region and the second region may be determined according to whether indication information of a .tmp format file is contained in the files corresponding to the first region and the second region; and determining the total score corresponding to the first region and the second region at least according to the first score may include determining the total score corresponding to the first region and the second region at least according to the first score, the second score, and the third score.

The total score corresponding to the first region and the second region may be determined according to the first score, the second score, and the third score, which may further improve the precision of merging two adjacent regions.

The embodiments of the present disclosure provide a device for merging regions of a Hadoop distributed file system database (HBase) table, including an acquiring unit, configured to acquire attribute information of HDFS files corresponding to each region in a plurality of regions in the HBase table, wherein the attribute information of the HDFS files corresponding to one region includes storage space occupied by the files corresponding to the one region; and a processing unit, configured to perform merging processing on every two adjacent regions in the plurality of regions at least according to the storage space occupied by the files corresponding to each region in the plurality of regions.

Optionally, the processing unit is further configured to eliminate duplicate regions.

Optionally, the device further include a determining unit configured to, for a first region and a second region, determine a sum of storage space occupied by files corresponding to the first region and the second region, wherein the first region and the second region are any two adjacent regions in the plurality of regions, and determine a first score corresponding to the first region and the second region according to the sum of the storage space occupied by the files and a storage space threshold.

The processing unit is configured to determine a total score corresponding to the first region and the second region at least according to the first score and perform the merging processing on the first region and the second region if the total score satisfies a preset value.

Optionally, the attribute information of the HDFS files corresponding to one region further includes a quantity of files corresponding to the one region; the determining unit is configured to determine a sum of quantities of the files corresponding to the first region and the second region and determine a second score corresponding to the first region and the second region according to the sum of the file quantities and a file quantity threshold value; and the processing unit is configured to determine the total score corresponding to the first region and the second region at least according to the first score and the second score.

Optionally, the attribute information of the HDFS files corresponding to one region further includes whether a .tmp directory is contained; the determining unit is configured to determine a third score corresponding to the first region and the second region according to whether indication information of a .tmp format file is contained in the files corresponding to the first region and the second region; and the processing unit is configured to determine the total score corresponding to the first region and the second region at least according to the first score, the second score, and the third score.

The embodiments of the present disclosure provide a computer readable storage medium. The computer readable storage medium stores computer executable instructions, and the computer executable instructions are configured to make a computer execute the above-mentioned method.

The embodiments of the present disclosure provide a computer apparatus, including a memory configured to store program instructions and a processor configured with one or more executable programs. The one or more executable programs are configured to execute the following method: acquiring attribute information of HDFS files corresponding to each region in a plurality of regions in the HBase table, wherein the attribute information of the HDFS files corresponding to one region includes storage space occupied by the files corresponding to the one region, and performing merging processing on every two adjacent regions in the plurality of regions at least according to the storage space occupied by the files corresponding to each region in the plurality of regions.

BRIEF DESCRIPTION OF THE DRAWINGS

In order to clearly illustrate the technical solutions in the embodiments of the present disclosure, the accompanying drawings, which are required to be used in the description of disclosed embodiments, are briefly described hereinafter. Obviously, the accompanying drawings in the following description are merely certain embodiments of the present disclosure. Other accompanying drawings derived from such accompanying drawings may be acquired by those skilled in the art without creative work.

FIG. 2 illustrates a method flow chart of a method for merging regions of the Hadoop distributed file system database (HBase) table in the embodiments of the present disclosure;

FIG. 3 illustrates a structural schematic of a device for merging regions of the Hadoop distributed file system database (HBase) table in the embodiments of the present disclosure.

DETAILED DESCRIPTION

The technical solutions in the embodiments of the present disclosure are described clearly and completely in conjunction with the drawings in the embodiments of the present disclosure. Obviously, the described embodiments are merely a part of the embodiments of the present disclosure, but not all the embodiments. Based on the embodiments of the present disclosure, all other embodiments obtained by those skilled in the art without creative work fall within the protection scope of the present disclosure.

For the terms "first", "second", and "ordinal number" mentioned in the present application, it should be understood as merely for distinguishing purposes.

Figure 1:
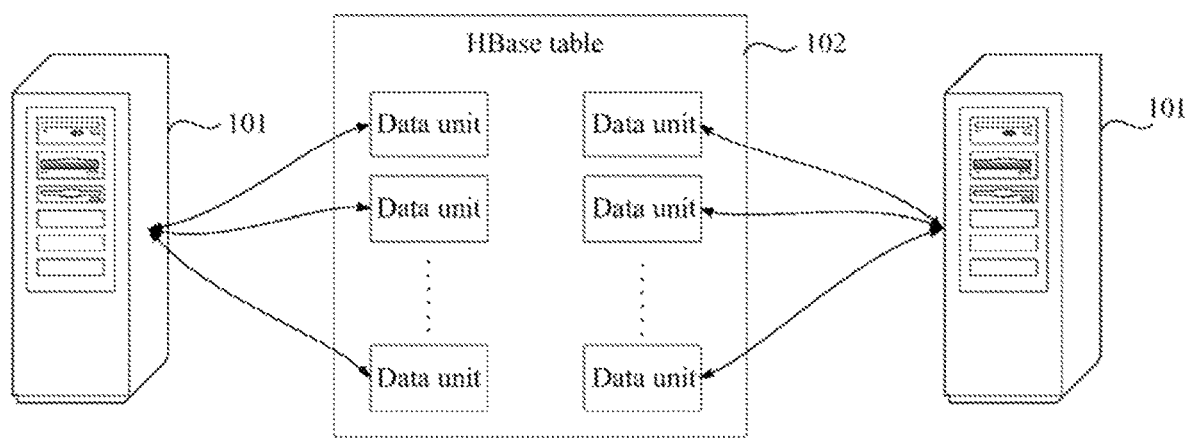
FIG. 1 illustrates a schematic of a communication system architecture in the embodiments of the present disclosure.

FIG. 1 illustrates a schematic of a communication system architecture applied in the embodiments of the present disclosure. As shown in FIG. 1, the system architecture may include at least one server 101 and an HBase table 102. In FIG. 1, two servers 101 are taken as an example for illustration. The server 101 may be configured as a 24-core Intel E5CPU, a 128G memory, and 20T storage space, and a region server may be deployed in each server. The role of the server deployed with the region server may be to manage tables and implement read and write operations. A client may be directly connected to the server deployed with the region server and acquire the data in the HBase table by communication. The memory of the HBase table 102 may be configured as 32G. The n regions in the HBase table may start to be created, where n is an integer greater than or equal to 1; a plurality of records may be filled in the HBase table; and regions may be the places where the HBase data is actually stored. That is, regions are the basic units of HBase availability and distribution. The threshold of the storage space occupied by files in the HBase table and the threshold of the file quantity may be preset.

In the embodiments of the present disclosure, in order to ensure that the quantity of regions is within a certain range, it is necessary to perform the merging operation on the regions in the HBase table. First, call the HBase API to acquire the region list RegionsInfo of the HBase table according to the table name of the HBase table entered by a user. The list RegionsInfo may include each region information TregionInfo, including start key value startKey, end key value endKey, name, server name serverName, version, identification id, and the like. All regions may be arranged in the order of their startKeys.

For example, startKey='' is arranged before startKey='0110324100032007126-79829274-79829274886359-341631-48025840-48020000-0-01#010'.

The embodiments of the present disclosure provide an optional specific format of the region list RegionsInfo: [TregionInfo(endKey='0110324100032007126-79829274-79829274886359-341631-48025840-48020000-0-01#010', name='user, 15133662038.0c9a9ba5d4927348c241c72f5d8dbd99.', serverName='d0204009',port='60020, startKey='',version='1,id='1513833662038),[TregionInfo(end-Key='0157900601461526-79838768-79838768854072-257271-01025810-00155800-X-Q1#010', name='user, 0110324100032007126-79829274-79829274886359-341631-48025840-48020000-0-01#010, 1513604444761.60ccd51b1fc3ccb12dac6e697d0600f7.', serverName='d0204009', port=60020, startKey='0179829274341798292748862948025840-48020000-0-01#010', version=1, id=1513604444761)].

In the embodiments of the present disclosure, the information of the path Region_path of each region in the HDFS files may be determined according to the name Region_name of each region in the region list RegionsInfo; and the attribute information of the HDFS files corresponding to each region may be queried according to the information of the path Region_path. Optionally, the attribute information of the files may include the storage space occupied by the files corresponding to the region, the quantity of files corresponding to the region, and whether a .tmp director is contained, which may be respectively named as length, fileCount, containsTmp; Region_name, Region_path, length, fileCount, containsTmp may be saved in the TregionInfo of the corresponding region; and the format of the obtained TregionInfo is as follows:

TregionInfo(endKey,name,serverName,port,startKey,version,id,Region_name, hdfs_path,length,fileCount,containsTmp).

Based on the system architecture shown in FIG. 1, FIG. 2 illustrates a method flow chart of a method for merging regions of the Hadoop distributed file system database (HBase) table in the embodiments of the present disclosure. As shown in FIG. 2, the region merging method of the HBase table may include the following steps.

At step 201, the attribute information of the HDFS files corresponding to each region in the plurality of regions in the HBase table may be acquired. The attribute information of the HDFS files corresponding to one region may include the storage space occupied by the files corresponding to the one region.

At step 202, the merging processing may be performed on every two adjacent regions in the plurality of regions at least according to the storage space occupied by the files corresponding to each region in the plurality of regions.

In the embodiments of the present disclosure, by acquiring the attribute information, which is the storage space occupied by the files corresponding to the region, of the HDFS files corresponding to each region in the plurality of regions in the HBase table, the merging processing may be performed on every two adjacent regions in the plurality of regions according to the storage space occupied by the files corresponding to each region in the plurality of regions. Therefore, performing the merging based on the storage space occupied by the files corresponding to the regions in the embodiments of the present disclosure may be beneficial for improving the precision of merging two adjacent regions. Furthermore, two adjacent regions need to be merged may be automatically determined without manual operation, which may improve the region merging efficiency.

In order to facilitate the merging processing of every two adjacent regions, a two-dimensional array, which is named Regions_Pair, of two adjacent regions may be constructed according to the acquired RegionsInfo in the embodiments of the present disclosure. Region[i] is two adjacent regions of an i-th pair, Region[i][0] is the first region of the i-th pair, and Region[i][1] is the second region of the i-th pair. The format of Regions_pair is as follows:

[[TregionInfo,TregionInfo] . . . [TregionInfo,TregionInfo]].

The embodiments of the present disclosure provide an implementation manner for determining whether two adjacent regions need to be merged according to the storage space occupied by the files corresponding to the regions. Specifically, the merging processing performed on every two adjacent regions in the plurality of regions at least according to the storage space occupied by the files corresponding to each region in the plurality of regions may include, for the first region and the second region, determining the sum of the storage space occupied by files corresponding to the first region and the second region, where the first region and the second region are any two adjacent regions in the plurality of regions, determining a first score corresponding to the first region and the second region according to the sum of the storage space occupied by the files and a storage space threshold, determining a total score corresponding to the first region and the second region at least according to the first score, and performing the merging processing on the first region and the second region if the total score satisfies a preset value.

In the embodiments of the present disclosure, the first score of two adjacent regions may be determined by determining the sum of the storage space occupied by the files corresponding to two adjacent regions. If the total score satisfies the preset value, the merging processing may be performed on two adjacent regions. In such way, the precision of selecting two adjacent regions which need to be merged may be improved.

In order to further improve the precision of merging two adjacent regions, each pair of adjacent regions may be initialized, and an initialization score may be set to zero. Then, the sum (named Region_size_sum) of the storage space occupied by the files corresponding to two adjacent regions (the first region and the second region) may be determined. If the sum of the storage space occupied by the files exceeds the storage space threshold (hbase.hRegion.max.filesize), the first score may be determined to be zero. Since the storage space occupied by the files has a relatively significant impact on the merging precision, in order to simplify the process of determining and selecting two adjacent regions, no other comparisons may be performed and it may be directly determined that the merging processing may not be performed on such two adjacent regions when the sum of the storage space occupied by the files exceeds the storage space threshold. If the sum of the storage space occupied by the files is less than the storage space threshold, the smaller the sum of the storage space occupied by the files is, the greater the value of merging two adjacent regions is and the higher the first score is. An optional manner to determine the score is adding 1−Region_size_sum/hbase.hRegion.max.filesize to the original score (which may be the initialization value), where the first score is 1−Region_size_sum/hbase.hRegion.max.filesize.

Optionally, the first score is named score and stored in the corresponding two-dimensional array Regions_Pair. Therefore, the information stored in the two-dimensional array Regions_Pair is as follows:

[[TregionInfo,TregionInfo,score] . . . [TregionInfo,TregionInfo,score]].

In the embodiments of the present disclosure, if the sums of the storage space occupied by the files corresponding to two Regions_Pairs are same, where the file quantity in the regions under one Regions_Pair is greater than the file quantity of another Regions_Pair, the Regions_Pair with a relatively small file quantity may be less likely to be compressed after being merged. Therefore, the merging value of the Regions_Pair with small file quantity may be greater than the merging value of the Regions_Pair with large file quantity. In the embodiments of the present disclosure, when the sums of the storage space occupied by the files corresponding to two Regions_Pairs are same, the precision of selecting two adjacent regions which need to be merged may be improved by determining the sum of the quantities of files corresponding to Regions_Pairs of the files.

Optionally, the attribute information of the HDFS files corresponding to one region may further include the quantity of the files corresponding to the one region; the sum of the quantities of files corresponding to the first region and the second region may be determined; the second score corresponding to the first region and the second region may be determined according to the sum of the file quantities and the file quantity threshold value; and determining the total score corresponding to the first region and the second region at least according to the first score may include determining the total score corresponding to the first region and the second region at least according to the first score and the second score.

In the embodiments of the present disclosure, an optional second score manner may be provided. If the sum (Region_file_num) of the quantities of the files corresponding to the first region and the second region is less than the file quantity threshold value, determining the second score corresponding to the first region and the second region may be adding 0.1*(1/Region_file_num) to the original score. If the sum (Region_file_num) of the quantities of the files corresponding to the first region and the second region is greater than the file quantity threshold value, the second score may be set to zero. Optionally, the total score corresponding to the first region and the second region may be determined to be the sum of the first score and the second score.

In the embodiments of the present disclosure, when compressing the regions, in the case if the .tmp directory of the regions exists in the regions, merging the regions causes issues on performance and stability, and it is necessary to consider whether the attribute information of the HDFS files corresponding to the regions should include whether the .tmp directory is contained.

In the embodiments of the present disclosure, the attribute information of the HDFS file corresponding to the one region may further include whether the .tmp directory is contained; a third score corresponding to the first region and the second region may be determined according to whether indication information of a .tmp format file is contained in the files corresponding to the first region and the second region; and determining the total score corresponding to the first region and the second region at least according to the first score may include determining the total score corresponding to the first region and the second region at least according to the first score, the second score, and the third score.

Optionally, if the attribute information of the HDFS files corresponding to two adjacent regions also includes the indication information configured to indicate the contained .tmp format file, the third score may be set to zero. That is, it is not necessary to merge the first region and the second region which contain the indication information indicating the contained .tmp format file. If the indication information indicating the contained .tmp format file is not included, the third score may be set to the original score.

Optionally, the total score corresponding to the first region and the second region may be the sum of the first score, the second score, and the third score.

In the embodiments of the present disclosure, two adjacent regions may form the Regions_Pair, and the scenario where one region exists in a plurality of Regions_pairs may be possible. In order to ensure the list in the Regions_pairs only containing a unique region, increase the region merging precision and improve the code stability, before performing the merging processing on two adjacent regions in the plurality of regions at least according to the storage space occupied by the files corresponding to each region of the plurality of regions, the method may further include eliminating duplicate regions. Specifically, duplicate regions in Regions_pairs with lower scores may be eliminated.

In the embodiments of the present disclosure, the merging processing may be sequentially performed on each Regions_pair by calling the region merging method in the HBase API or the HBase shell.

For ease of description, the embodiments of the present disclosure may be described with the following specific examples. Adjacent regions included in the HBase table is assumed to be 10. The storage space threshold occupied by the files hbase.hRegion.max.filesize=10 G and the file quantity threshold hbase.hstore.compactionThreshold=5 may be used as an example. The attribute information of the HDFS files corresponding to each region is assumed to be shown in Table 1.

TABLE 1

Attribute information of the HDFS files corresponding to each region

| Region name | Storage space occupied by HDFS files corresponding to each region (G) | Quantity of the files corresponding to region | Whether indication information contains .tmp format file |
|---|---|---|---|
| RG01 | 2 | 5 | Yes |
| RG02 | 4 | 2 | Yes |
| RG03 | 3 | 3 | Yes |
| RG04 | 3 | 6 | Yes |
| RG05 | 4 | 2 | Yes |
| RG06 | 1 | 3 | Yes |
| RG07 | 1 | 3 | Yes |
| RG08 | 12 | 2 | Yes |
| RG09 | 1 | 1 | No |
| RG10 | 1 | 5 | No |

For table 1, two adjacent regions may be denoted as one Regions_Pair, as shown in Table 2.

TABLE 2

Regions_Pair

| Regions_Pair |
|---|
| <RG01, RG02> |
| <RG02, RG03> |
| <RG03, RG04> |
| <RG04, RG05> |
| <RG05, RG06> |
| <RG06, RG07> |
| <RG07, RG08> |
| <RG08, RG09> |
| <RG09, RG10> |

For the first region and the second region in each Regions_Pair, the sum of the storage space occupied by the files corresponding to the first region and the second region, the sum of the file quantities, and whether the indication information contains the .tmp format file may be determined. According to that the first score is zero when the sum of the storage space occupied by the files exceeds the storage space threshold, when the sum of the storage space occupied by the files is less than the storage space threshold, the first score may be adding 1−Region_size_sum/hbase.hRegion.max.filesize on the basis of the original score (which may be the initialization value). When the sum of the file quantities (Region_file_num) is less than the file quantity threshold, the second score may be adding 0.1*(1/Region_file_num) on the basis of the original score. If the sum (Region_file_num) of the quantities of the files corresponding to the first region and the second region is greater than the file quantity threshold, the second score may be set to zero. The attribute information of the HDFS files corresponding to two adjacent regions also includes the .tmp directory, so that the third score may be set to zero. The total score corresponding to each Regions_Pair may be determined according to the first score, the second score, and the third score, as shown in Table 3.

TABLE 3

Total score corresponding to each Regions_Pair

| Regions_Pair | Score | Remarks |
|---|---|---|
| <RG01, RG02> | 0.4142857 | — |
| <RG02, RG03> | 0.42 | — |

TABLE 3-continued

Total score corresponding to each Regions_Pair

| Regions_Pair | Score | Remarks |
|---|---|---|
| <RG03, RG04> | 0.4111111 | — |
| <RG04, RG05> | 0.3125 | — |
| <RG05, RG06> | 0.52 | — |
| <RG06, RG07> | 0.8166667 | — |
| <RG07, RG08> | 0 | Storage sum of HDFS files exceeds 1 G |
| <RG08, RG09> | 0 | .tmp directory is not empty |
| <RG09, RG10> | 0 | .tmp directory is not empty |

If the total score satisfies the preset value, the Regions_Pairs may be merged. When the preset value is assumed to be 0.4, the Regions_Pairs which meet such condition may be selected, as shown in Table 4.

TABLE 4

Regions_Pair meeting the condition

| Regions_Pair | Score |
|---|---|
| <RG01, RG02> | 0.4142857 |
| <RG02, RG03> | 0.42 |
| <RG03, RG04> | 0.4111111 |
| <RG05, RG06> | 0.52 |
| <RG06, RG07> | 0.8166667 |

Duplicate regions in Regions_Pairs may be eliminated. When certain regions are duplicated, only the Regions_Pair with the largest score value may be retained according to the score size. It may be seen from Table 4 that RG02, RG03, and RG06 are duplicated in the list. Therefore, the Regions_Pairs with larger score values are retained, and the Regions_Pairs that need to be merged are shown in Table 5.

TABLE 5

Regions_Pairs that need to be merged

| Regions_Pair | Score |
|---|---|
| <RG02, RG03> | 0.42 |
| <RG06, RG07> | 0.8166667 |

The remaining Regions_Pairs in Regions_Pairs may be extracted, the merge_Region operation may be executed in batches through the HBase API, and all regions that meet the condition may be merged.

It may be seen from the above-mentioned description that, in the embodiments of the present disclosure, by acquiring the attribute information, which is the storage space occupied by the file corresponding to the region, of the HDFS file corresponding to each region in the plurality of regions in the HBase table in the embodiments of the present disclosure, the merging processing may be performed on every two adjacent regions in the plurality of regions according to the storage space occupied by the files corresponding to each region in the plurality of regions. Therefore, performing the merging processing based on the storage space occupied by the files corresponding to the regions in the embodiments of the present disclosure may be beneficial for improving the precision of merging two adjacent regions. Furthermore, two adjacent regions need to be merged may be automatically determined without manual operation, which may improve the region merging efficiency.

Based on the same technical concept, a device for merging regions of the HBase table is provided in the embodiments of the present disclosure, where the device may execute the above-mentioned method embodiments. FIG. 3 illustrates a structural schematic of a device for merging regions of the Hadoop distributed file system database (HBase) table in the embodiments of the present disclosure. As shown in FIG. 3, a device 300 may include an acquiring unit 301, a processing unit 302, and may optionally include a determining unit 303.

The acquiring unit may be configured to acquire the attribute information of the HDFS files corresponding to each region in the plurality of regions in the HBase table. The attribute information of the HDFS files corresponding to one region may include the storage space occupied by the files corresponding to the one region. The processing unit may be configured to perform the merging processing on every two adjacent regions in the plurality of regions at least according to the storage space occupied by the files corresponding to each region in the plurality of regions.

Optionally, the processing unit may further be configured to eliminate duplicate regions.

Optionally, the device may further include the determining unit, configured to, for the first region and the second region, determine the sum of the storage space occupied by the files corresponding to the first region and the second region, where the first region and the second region are any two adjacent regions in the plurality of regions, and to determine a first score corresponding to the first region and the second region according to the sum of the storage space occupied by the files and the storage space threshold. The processing unit may be configured to determine a total score corresponding to the first region and the second region at least according to the first score and perform the merging processing on the first region and the second region if the total score satisfies a preset value.

Optionally, the attribute information of the HDFS files corresponding to the one region may further include the quantity of files corresponding to the one region. The determining unit may be configured to determine the sum of the quantities of files corresponding to the first region and the second region and determine a second score corresponding to the first region and the second region according to the sum of the file quantities and the file quantity threshold value. The processing unit may be configured to determine the total score corresponding to the first region and the second region at least according to the first score and the second score.

Optionally, the attribute information of the HDFS files corresponding to the one region may further include whether a .tmp directory is contained. The determining unit may be configured to determine a third score corresponding to the first region and the second region according to whether the files corresponding to the first region and the second region contain the indication information of the .tmp format file. The processing unit may be configured to determine the total score corresponding to the first region and the second region at least according to the first score, the second score, and the third score.

It may be seen from the above-mentioned description that, in the embodiments of the present disclosure, by acquiring the attribute information, which is the storage space occupied by the file corresponding to the region, of the HDFS file corresponding to each region in the plurality of regions in the HBase table in the embodiments of the present disclosure, the merging processing may be performed on every two adjacent regions in the plurality of regions according to the storage space occupied by the files corresponding to each region in the plurality of regions. Therefore, performing the merging processing based on the storage space occupied by the files corresponding to the regions in the embodiments of the present disclosure may be beneficial for improving the precision of merging two adjacent regions. Furthermore, two adjacent regions need to be merged may be automatically determined without manual operation, which may improve the region merging efficiency.

Figure 4:
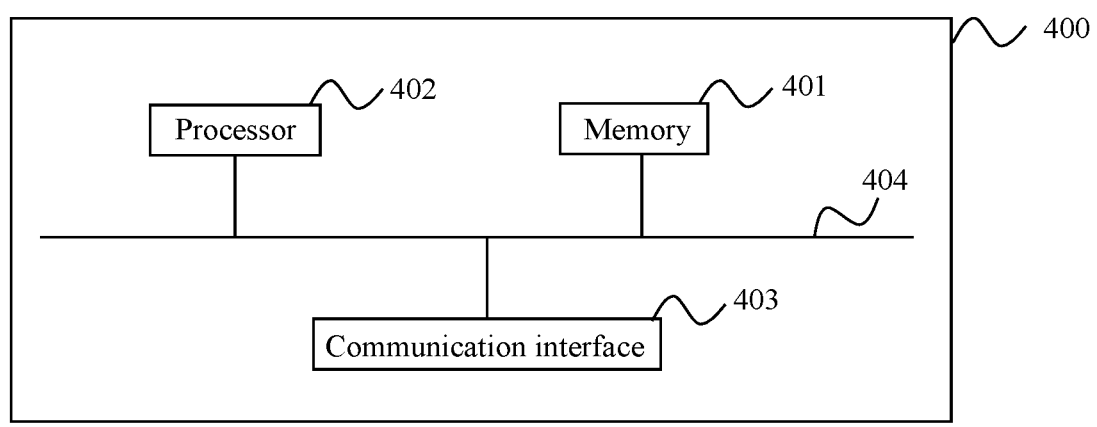
FIG. 4 illustrates a structural schematic of a computer apparatus in the embodiments of the present disclosure.

Referring to FIG. 4, another embodiment of the present disclosure provides a computer apparatus configured to be applied to the above-mentioned embodiments of the present disclosure. The computer apparatus may include a memory 401, a processor 402, and a communication interface 403.

The memory 401 may store one or more executable programs, configured to configure the processor 402.

The processor 402 may be configured with one or more executable programs. The one or more executable programs may be configured to execute the following method: acquiring attribute information of HDFS files corresponding to each region in a plurality of regions in the HBase table, wherein the attribute information of the HDFS files corresponding to one region includes storage space occupied by the files corresponding to the one region; and performing merging processing on every two adjacent regions in the plurality of regions at least according to the storage space occupied by the files corresponding to each region in the plurality of regions.

The memory 401 may be configured to store programs. Specifically, the programs may include program code, and the program code may include computer operation instructions. The memory 401 may be a volatile memory such as a random-access memory (abbreviated as RAM), may also be a non-volatile memory such as a flash memory, a hard disk drive (abbreviated as HDD) or a solid-state drive (abbreviated as SSD), and may also be any one or a combination of any of the above-mentioned volatile memory and non-volatile memory.

The memory 401 may store the following elements, executable modules or data structures, or their subsets or extended sets, including:

operating instructions which may include various operating instructions to implement various operations, and an operating system which may include various system programs, configured to implement various basic services and process hardware-based tasks.

The processor 402 may be a central processing unit (CPU), a network processor (NP), or a combination of the CPU and NP, and may also be a hardware chip. The above-mentioned hardware chip may be an application-specific integrated circuit (ASIC), a programmable logic device (PLD), or a combination thereof. The above-mentioned PLD may be a complex programmable logic device (CPLD), a field-programmable gate array (FPGA), a general array logic (generic array logic, GAL), or any combination thereof. In a possible design, the memory 401 may also be integrated with the processor 402.

The communication interface 403 may be a wired communication access port, a wireless communication interface, or a combination thereof. The wired communication interface may be, for example, an Ethernet interface. The Ethernet interface may be an optical interface, an electrical interface, or a combination thereof. The wireless communication interface may be a WLAN interface.

A bus 404 may be a peripheral component interconnect (PCI) bus or an extended industry standard architecture (EISA) bus. The bus can be divided into an address bus, a data bus, a control bus, and the like. For ease of illustration, only one thick line is used in FIG. 4 to illustrate the bus, which may not indicate that there is only one bus or one type of bus.

In a possible implementation manner, the processor 402 may further be configured to:
eliminate duplicate regions.

In a possible implementation manner, the processor 402 may further be configured to, for a first region and a second region, determine a sum of storage space occupied by files corresponding to the first region and the second region, where the first region and the second region are any two adjacent regions in the plurality of regions, determine a first score corresponding to the first region and the second region according to the sum of the storage space occupied by the files and a storage space threshold, determine a total score corresponding to the first region and the second region at least according to the first score, and perform the merging processing on the first region and the second region if the total score satisfies a preset value.

In a possible implementation manner, the attribute information of the HDFS files corresponding to one region may further include the quantity of files corresponding to the region. The processor 402 may further be configured to:
determine a sum of quantities of the files corresponding to the first region and the second region, determine a second score corresponding to the first region and the second region according to the sum of the file quantities and a file quantity threshold value, and determine the total score corresponding to the first region and the second region at least according to the first score and the second score.

In a possible implementation manner, the attribute information of the HDFS files corresponding to one region may further include whether a .tmp directory is contained. The processor 402 may further be configured to:
determine a third score corresponding to the first region and the second region according to whether indication information of a .tmp format file is contained in the files corresponding to the first region and the second region, and determine the total score corresponding to the first region and the second region at least according to the first score, the second score, and the third score.

Those skilled in the art should understand that the embodiments of the present disclosure may be provided as methods, systems, or computer program products. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (including but may not be limited to disk storage, CD-ROM, optical storage, and the like) containing computer-usable program codes.

The present disclosure is described with reference to flowcharts and/or block diagrams of methods, devices (systems), and computer program products according to the embodiments of the present disclosure. It should be understood that each process and/or block in the flowcharts and/or block diagrams, and the combination of processes and/or blocks in the flowcharts and/or block diagrams may be implemented by computer program instructions. Such computer program instructions may be provided to the processor of a general-purpose computer, a special-purpose computer, an embedded processor, or other programmable data processing apparatus, such that the instructions executed by the processor of the computer or other programmable data processing apparatus may implement the functions specified in one or more processes in the flowcharts and/or one or more blocks in the block diagrams.

Such computer program instructions may also be stored in a computer-readable memory that can direct a computer or other programmable data processing apparatus to work in a specific manner, such that the instructions stored in the computer-readable memory produce a manufacturing article including the instruction device. The instruction device implements the functions specified in one or more processes in the flowcharts and/or one or more blocks in the block diagrams.

Such computer program instructions may also be loaded on a computer or other programmable data processing apparatus, such that a series of operation steps are executed on the computer or other programmable apparatus to produce computer-implemented processing. Therefore, the instructions executed by the processor of the computer or other programmable data processing apparatus may implement the functions specified in one or more processes in the flowcharts and/or one or more blocks in the block diagrams.

Although the preferred embodiments of the present disclosure have been described, those skilled in the art may make additional changes and modifications to such embodiments once they learn the basic creative concept. Therefore, the appended claims may be intended to be interpreted as including the preferred embodiments and all changes and modifications falling within the scope of the present disclosure.

Obviously, those skilled in the art may make various changes and modifications to the present disclosure without departing from the spirit and scope of the present disclosure. In such way, if these modifications and variations of the present disclosure fall within the scope of the claims of the present disclosure and their equivalent technologies, the present disclosure may also be intended to include these modifications and variations.

What is claimed is:

1. A method for merging regions of a Hadoop distributed file system database (HBase) table, comprising:
acquiring attribute information of Hadoop distributed file system (HDFS) files stored in each region of a plurality of regions in the HBase table, wherein the attribute information, of the HDFS files stored in the each region of the plurality of regions, includes storage space occupied by the HDFS files stored in the each region of the plurality of regions;
determining candidate pairs of adjacent regions, wherein each candidate pair of adjacent regions includes two adjacent regions in the plurality of regions;
determining a total score for the each candidate pair of adjacent regions according to the storage space occupied by the HDFS files stored in the each region of the plurality of regions;
filtering out, from the candidate pairs of adjacent regions, one or more pairs of adjacent regions having a total score lower than a preset value, to obtain one or more selected candidate pairs of adjacent regions;
when two selected candidate pairs of adjacent regions include a same region, filtering out, from the two selected candidate pairs of adjacent regions, one pair of adjacent regions having a lower total score in the two selected candidate pairs of adjacent regions, to obtain one or more remaining-selected candidate pairs of adjacent regions; and
performing merging processing on every two adjacent regions in every pair of the remaining-selected candidate pairs of adjacent regions.

2. The method according to claim 1, wherein determining the total score for the each candidate pair of adjacent regions includes:
  for a first region and a second region of each candidate pair of adjacent regions, determining a sum of storage space occupied by the HDFS files stored in the first region and the second region;
  determining a first score corresponding to the first region and the second region according to the sum of the storage space occupied by the HDFS files and a storage space threshold; and
  determining the total score of the candidate pair of adjacent regions containing the first region and the second region at least according to the first score.

3. The method according to claim 2, wherein: the attribute information further includes a quantity of HDFS files stored in the each region of the plurality of regions; and determining the total score for the each candidate pair of adjacent regions further comprises:
  determining a sum of quantities of the HDFS files stored in the first region and the second region;
  determining a second score corresponding to the first region and the second region according to the sum of quantities and a file quantity threshold value; and
  determining the total score of the candidate pair of adjacent regions containing the first region and the second region at least according to the first score and the second score.

4. The method according to claim 3, wherein: the attribute information further includes whether a .tmp directory is contained; and determining the total score for the each candidate pair of adjacent regions further comprises:
  determining a third score corresponding to the first region and the second region according to whether indication information of a .tmp format file is contained in the HDFS files stored in the first region and the second region; and
  determining the total score of the candidate pair of adjacent regions containing the first region and the second region at least according to the first score, the second score, and the third score.

5. The method according to claim 3, wherein the second score is negatively related to the sum of quantities of the HDFS files stored in the first region and the second region when the sum of quantities is lower than the file quantity threshold value.

6. The method according to claim 5, wherein the second score is a preset value when the sum of quantities is not lower than the file quantity threshold value.

7. The method according to claim 2, wherein the first score is negatively related to the sum of storage spaces occupied by the HDFS files stored in the first region and the second region when the sum of storage spaces is lower than the storage space threshold.

8. The method according to claim 7, wherein the first score is a preset value when the sum of storage spaces is not lower than the storage space threshold.

9. The method according to claim 1, wherein:
  the attribute information further includes a quantity of HDFS files stored in the each region of the plurality of regions; and
  the total score for each candidate pair of adjacent regions is determined according to the storage space occupied by the HDFS files stored in the two adjacent regions in each candidate pair and a sum of quantities of the HDFS files stored in the two adjacent regions in each candidate pair.

10. A computer apparatus, comprising:
  a processor and a memory, wherein:
  the memory stores one or more executable programs, configured to configure the processor; and
  the processor is configured to execute the one or more executable programs to perform:
    acquiring attribute information of Hadoop distributed file system (HDFS) files stored in each region of a plurality of regions in the HBase table, wherein the attribute information, of the HDFS files stored in the each region of the plurality of regions, includes storage space occupied by the HDFS files stored in the each region of the plurality of regions;
    determining candidate pairs of adjacent regions, wherein each candidate pair of adjacent regions includes two adjacent regions in the plurality of regions;
    determining a total score for the each candidate pair of adjacent regions according to the storage space occupied by the HDFS files stored in the each region of the plurality of regions;
    filtering out, from the candidate pairs of adjacent regions, one or more pairs of adjacent regions having a total score lower than a preset value, to obtain one or more selected candidate pairs of adjacent regions;
    when two selected candidate pairs of adjacent regions include a same region, filtering out, from the two selected candidate pairs of adjacent regions, one pair of adjacent regions having a lower total score in the two selected candidate pairs of adjacent regions, to obtain one or more remaining-selected candidate pairs of adjacent regions; and
    performing merging processing on every two adjacent regions in every pair of the remaining-selected candidate pairs of adjacent regions.

11. The computer apparatus according to claim 10, wherein determining the total score for the each candidate pair of adjacent regions comprises:
  for a first region and a second region of each candidate pair of adjacent regions, determining a sum of storage space occupied by the HDFS files stored in the first region and the second region;
  determining a first score corresponding to the first region and the second region according to the sum of the storage space occupied by the HDFS files and a storage space threshold; and
  determining the total score of the candidate pair of adjacent regions containing the first region and the second region at least according to the first score.

12. The computer apparatus according to claim 11, wherein: the attribute information further includes a quantity of HDFS files stored in the each region of the plurality of regions; and determining the total score for the each candidate pair of adjacent regions further comprises:
  determining a sum of quantities of the HDFS files stored in the first region and the second region;
  determining a second score corresponding to the first region and the second region according to the sum of quantities and a file quantity threshold value; and
  determining the total score of the candidate pair of adjacent regions containing the first region and the second region at least according to the first score and the second score.

13. The computer apparatus according to claim 12, wherein: the attribute information further includes whether a .tmp directory is contained; and determining the total score for the each candidate pair of adjacent regions further comprises:
  determining a third score corresponding to the first region and the second region according to whether indication information of a .tmp format file is contained in the HDFS files stored in the first region and the second region; and
  determining the total score corresponding to the first region and the second region at least according to the first score, the second score, and the third score.

14. A non-transitory computer readable storage medium storing computer executable instructions, wherein the computer executable instructions are configured to make a computer execute:
  acquiring attribute information of Hadoop distributed file system (HDFS) files stored in each region of a plurality of regions in the HBase table, wherein the attribute information, of the HDFS files stored in the each region of the plurality of regions, includes storage space occupied by the HDFS files stored in the each region of the plurality of regions;
  determining candidate pairs of adjacent regions, wherein each candidate pair of adjacent regions includes two adjacent regions in the plurality of regions;
  determining a total score for the each candidate pair of adjacent regions according to the storage space occupied by the HDFS files stored in the each region of the plurality of regions;
  filtering out, from the candidate pairs of adjacent regions, one or more pairs of adjacent regions having a total score lower than a preset value, to obtain one or more selected candidate pairs of adjacent regions;
  when two selected candidate pairs of adjacent regions include a same region, filtering out, from the two selected candidate pairs of adjacent regions, one pair of adjacent regions having a lower total score in the two selected candidate pairs of adjacent regions, to obtain one or more remaining-selected candidate pairs of adjacent regions; and
  performing merging processing on every two adjacent regions in every pair of the remaining-selected candidate pairs of adjacent regions.

* * * * *